United States Patent
Deiss (10) Patent No.: US 10,179,376 B2
(45) Date of Patent: Jan. 15, 2019

(54) MACHINES FOR THE SEPARATIVE MACHINING OF PLATE-SHAPED MATERIALS

(71) Applicant: TRUMPF Werkzeugmaschinen GmbH + Co. KG, Ditzingen (DE)

(72) Inventor: Magnus Deiss, Stuttgart (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 0 days.

(21) Appl. No.: 15/835,681

(22) Filed: Dec. 8, 2017

(65) Prior Publication Data

US 2018/0099354 A1    Apr. 12, 2018

Related U.S. Application Data

(63) Continuation of application No. PCT/EP2016/064018, filed on Jun. 17, 2016.

(30) Foreign Application Priority Data

Jun. 18, 2015  (DE) .......................... 10 2015 109 740

(51) Int. Cl.
  *B23K 37/04*   (2006.01)
  *B23K 26/08*   (2014.01)
  (Continued)

(52) U.S. Cl.
  CPC .......... *B23K 26/0876* (2013.01); *B23K 26/38* (2013.01); *B23K 26/702* (2015.10);
  (Continued)

(58) Field of Classification Search
  CPC ................ B26D 7/20; B26D 2007/206; B23K 37/0408; B23K 37/0461; B23K 26/38
  See application file for complete search history.

(56) References Cited

U.S. PATENT DOCUMENTS 3,618,436 A * 11/1971 Brown ..................... B26D 7/20
                                                101/425
4,730,526 A *  3/1988 Pearl ..................... B26D 7/018
                                                198/689.1
(Continued)

FOREIGN PATENT DOCUMENTS

DE        2825090        12/1979
DE        3782727        5/1998    ............... D06H 7/24
(Continued)

OTHER PUBLICATIONS

International Preliminary Report on Patentability in International Application No. PCT/EP2016/064018, dated Dec. 19, 2017, 5 pages.

(Continued)

*Primary Examiner* — Sean Michalski
(74) *Attorney, Agent, or Firm* — Fish & Richardson P.C.

(57) ABSTRACT

The invention relates to machines for the separative machining of plate-shaped workpieces using a machining tool. The machines include two workpiece support surfaces for supporting the workpiece, between which a gap is formed, and at least one carriage that is movable in or along the gap, and is connected to at least one covering element. The covering element at least partially covers the gap and includes a chain with a plurality of chain links. The chain links can have a brush support on an upper side and are designed to pivot with respect to one another, wherein at least two mutually adjacent chain links have a pivot-limiting angle ($\alpha$) with respect to the longitudinal axis of each of the chain links such that, with a rectilinear orientation to one another and without exposure to force, the chain links assume a non-planar profile.

20 Claims, 4 Drawing Sheets

(51) Int. Cl.
*B23K 26/38* (2014.01)
*B26D 7/20* (2006.01)
*B23K 26/70* (2014.01)

(52) U.S. Cl.
CPC ...... *B23K 37/0408* (2013.01); *B23K 37/0461* (2013.01); *B26D 7/20* (2013.01); *B26D 2007/206* (2013.01)

(56) References Cited

U.S. PATENT DOCUMENTS

| | | | | |
|---|---|---|---|---|
| 4,993,296 | A * | 2/1991 | Nasu | B23Q 5/34 83/422 |
| 5,001,954 | A * | 3/1991 | Andrada Galan | B25B 11/005 198/689.1 |
| 5,224,406 | A * | 7/1993 | Nasu | B26D 7/018 269/21 |
| 5,358,226 | A * | 10/1994 | Arikita | B26D 7/20 269/21 |
| 5,596,917 | A * | 1/1997 | Gerber | B26D 7/018 198/689.1 |
| 5,730,431 | A * | 3/1998 | Cattini | B25B 11/005 269/21 |
| 7,168,351 | B2 | 1/2007 | Hirayama et al. | |
| 8,132,663 | B2 * | 3/2012 | Nakai | B26D 7/20 198/688.1 |
| 2013/0270075 | A1 * | 10/2013 | Balsells Mercade | B65G 15/58 198/851 |
| 2016/0297036 | A1 | 10/2016 | Schmauder et al. | |
| 2017/0266737 | A1 * | 9/2017 | Kramer | B23C 3/13 |
| 2018/0193958 | A1 * | 7/2018 | Ozeki | B21D 43/10 |

FOREIGN PATENT DOCUMENTS

| | | | |
|---|---|---|---|
| DE | 20112006 | 2/2002 | |
| DE | 602004000175 | 8/2006 | ............ B24B 51/00 |
| DE | 102011051170 | 12/2012 | |
| DE | 202012104073 | 1/2013 | ............ A63B 9/00 |
| DE | 102013226818 | 6/2015 | ............ B23Q 3/00 |
| EP | 0271116 | 6/1988 | ............ D06H 7/24 |

OTHER PUBLICATIONS

International Search Report for International Application No. PCT/EP2016-064018 dated Sep. 21, 2016 (4 pages).

* cited by examiner

MACHINES FOR THE SEPARATIVE MACHINING OF PLATE-SHAPED MATERIALS

CROSS-REFERENCE TO RELATED APPLICATIONS

This application is a continuation of and claims priority under 35 U.S.C. § 120 from PCT Application No. PCT/EP2016/064018 filed on Jun. 17, 2016, which claims priority from German Application No. DE 10 2015 109 740.0, filed on Jun. 18, 2015. The entire contents of each of these priority applications are incorporated herein by reference.

TECHNICAL FIELD

The invention relates to machines for separative machining of plate-shaped workpieces.

BACKGROUND

A machine for separative machining of plate-shaped workpieces is known from DE 10 2011 051 170 A1.

In a machining device such as this, the tool for separative machining, for example a laser machining head or a punching tool can be moveably arranged within or above the gap. In particular, the machine can have a first movement device for moving the workpiece in a first direction and a second movement device for moving the workpiece in a second direction. This machine has two workpiece support surfaces for supporting the workpiece, between which a gap is formed. At least one moveable carriage is provided in or along the gap, which is connected to at least one covering element, which covers the gap at least partially during the machining of the workpiece.

An analogous construction of such a machine is also known from U.S. Pat. No. 4,993,296.

SUMMARY

The present invention provides machines for separative machining of workpieces, which enables better support of the workpiece parts during the separative machining.

The new machines provide better support for workpieces by including a covering element that includes a chain having several chain links with a brush bed on an upper side thereof. At least two chain links, which are adjacent to each other, have a pivot-limiting angle ($\alpha$) relative to the longitudinal axis of the chain links, so that the chain links assume a non-planar course with respect to one another when in a rectilinear alignment without the application of force. In this way, the chain, in a non-pressurized state, i.e., without the application of force on the chain links, assumes a course that is curved slightly upwards with respect to a plane, e.g., with respect to the workpiece support of the machine. As soon as the chain links are transferred into a planar arrangement by a workpiece resting on the chain or by a guide element, a bias or a force against the direction of gravity acts on the at least two adjacent chain links.

In this way, the covering elements arranged in the gap between the workpiece support surfaces can be easily prevented from sagging. Instead, the covering elements support the workpiece located thereon in analogy to the workpiece support surfaces, so that an almost completely closed workpiece support surface can be formed. The covering elements may be provided for a partial or a full gap cover. Tilting or tipping of workpiece parts that are already at least partially cut is thus avoided. In this way, during the separative machining, the workpiece can be reliably moved for machining along a direction transverse to the gap.

In some embodiments, the covering element for the machines for separative machining have chain links that assume a convex course, in particular in a horizontal alignment with respect to the direction of gravity. It is thus possible for a higher biasing force to be achieved to counteract the gravitational force acting on the covering element in the gap, where the covering element is not supported by any supporting means.

In some implementations, the pivot-limiting angle ($\alpha$) between two chain links, which are adjacent to each other relative to the longitudinal axis, is at least 1°. This means that the chain links assume a slightly bulging course in the substantially horizontal alignment of the chain due to the pivot-limiting angle.

The chain links of the chain can also have, for example, a pivot angle ($\beta$) of 1° to 60° relative to each other, and in some embodiments, the pivot angle ($\beta$) adjoins the pivot-limiting angle ($\alpha$) directly and is opposite the longitudinal axis. In this way a structurally simple construction is formed, such that the pivot-limiting angle ($\alpha$) can act during unwinding of a rolled-up chain for introduction directly into the gap.

A carriage arranged in the gap, which is connected to the covering element and by which the covering element can be moved in the gap, can be formed as a support carriage that has a support surface for supporting the workpiece parts that are cut by the separative machining. If the support carriages are formed to be longer, the free length of the gap, which must be covered by the chain, can be kept short. If a shortest possible chain is used, problems that could result from sagging of the chain are avoided.

Alternatively, the carriage, which is connected to the covering element and serves for its movement, can be formed without a support surface and can be arranged, for example, under the covering element or next to the covering element adjacent to the gap.

In some embodiments, the covering element can include a brush support on the chain formed from a plate fitted with brushes. In this way, a simple and quick adaptation of the chain, consisting of several chain links, to the respective workpiece support surface can be achieved by using the same materials provided for the workpiece support surfaces, for the brush support of the chain links.

In certain embodiments, a guide is provided in the gap or adjacent to the gap of the machine, through which the chain links are guided and the brush support on the upper side of the chain links are each aligned in the gap flush with the workpiece support surfaces. The guide can be aligned in height, i.e., in the Z direction, within the gap or adjacent to the gap, in such a way that the brush ends of the brush mat on the chain links are aligned flush to the workpiece support surfaces, so that a closed workpiece support is formed.

The guide of the machine in the gap can be formed as a rail, which is arranged as a device to hold-down the chain links in the gap, and against which the chain links abut, e.g., rest, during the travelling movement of the covering element. The individual chain links which, due to the predetermined pivoting angle, assume a bulging course that points slightly in the Z-direction with respect to the horizontal, are held down by this hold-down device so that all chain links bear against the hold-down device as a counter bearing with a low bias and thus can receive a bearing force that acts on the covering element through the workpiece.

To close a gap that may exist between the covering element and the adjacent workpiece support surface, when the rail is arranged in the gap, a brush support can be provided on the upper side of the rail. In this way, the area between the workpiece support surface and the adjacent travelling brush support of the covering element can be closed.

In another embodiment, the guide that is in or adjacent to the gap of the machine is formed as an L-shaped rail comprising a short and a long flank. The short (horizontal) flank can be formed as a hold-down element. The long (vertical) flank, which is aligned in the Z direction, can form a lateral guide for the covering element, which can move back and forth and control travelling movement of the covering element in the gap. In this way, a one-sided guide of the chain can be sufficient for a controlled travelling movement of the covering element in the gap.

A further advantageous embodiment of the guide provides that the guide extends along the gap that is formed between the workpiece support surfaces. A support point for the chain links entering the gap can be provided at the entrance of the gap to position the chain properly for the guide. In this way, a secure movement of the at least one chain during entry and exit in and out of the gap is enabled.

Furthermore, a guide section without brush support can be formed on the upper side of the chain links along a side edge along the chain, said guide section resting on the guide. In this way, the chain can be guided directly by the guide, for example, by the rail formed as a hold-down element, without further burdensome measures or additional attachments being required on the chain links.

A further advantageous embodiment of the machines provides that an end of the covering element formed as a chain is fixed to the carriage that is moveable in the gap and the other end of the chain is provided on a winding shaft or is arranged rollably in a guide. In this way, a space-saving housing of the covering element can be provided.

In another embodiment, the covering element can be formed as an energy guiding chain, which can include a receiving space for receiving at least one supply line. This enables a cost-effective construction. Furthermore, a covering element formed as an energy guiding chain is additionally usable for guiding lines or cables. In this embodiment, a housing cover of a chain link of the energy guiding line can be formed as a brush support or can be formed to receive a brush support. Furthermore, by a simple exchange, the usual housing cover of the chain links of an energy guiding chain can be replaced with a brush support.

The object of the invention is further solved by a covering element for machines as described herein, which includes a chain having multiple chain links, which have a brush support on an upper side that is formed by a plate fitted with brushes, wherein at least two chain links adjacent to one another have a pivot-limiting angle ($\alpha$) relative to the longitudinal axis of the chain links, so that the chain links assume a non-linear course with respect to one another without the application of force. In addition, a bias between the individual chain links can be generated by this pivot-limiting angle ($\alpha$) when the individual chain links are arranged in a plane. In an alignment of the chain links in a horizontal plane, the bias between the chain links acts against the direction of gravity. When a workpiece is supported on the chain, a support force also acts to support the workpiece in the gap between the workpiece support surfaces.

The covering elements can assume a convex course in a rectilinear alignment with one another, in particular a course that is bulging relative to the direction of gravity in the case of a horizontal alignment of the chain. Thus, for example, a convex course of the chain, which is against the direction of gravity, i.e., directed vertically upwards, can be established, for example, between two support points by which the respective chain links are supported in a horizontal alignment of the covering elements, so that when the covering element is transferred into a horizontal plane, a biasing force is built up between the individual chain links, which counteracts a workpiece resting on the covering elements.

Such a pivot-limiting angle ($\alpha$) between two chain links comprises at least 1°. In particular, in the case of long gaps to be bridged, the pivot-limiting angle can be increased.

Furthermore, the chain links of the covering element can have a pivot angle ($\beta$) of 1° to 60°, extending from the longitudinal axis of the chain link, which adjoins the pivot-limiting angle ($\alpha$) directly. A simple constructive solution is thus created, in which first a winding or rolling up of the chain is made possible and second, when the chain is introduced, for example, into a gap between two workpiece support surfaces, a self-acting alignment of the chain links relative to one another can take place.

The covering elements are provided in particular for a partial or full gap cover for the machines described herein. Such a covering element, provided with brushes, can serve as gap cover for a machine for separative machining of workpieces having two workpiece support surfaces, between which a gap is formed, so that during the machining of the workpiece, the workpiece can be supported over as large a surface area as possible.

The covering element can include a guide portion without a brush support on the upper side of the chain links along a side edge of the chain links. A simple guide can thus be sufficient to hold down the chain.

Furthermore, the chain links and the hinged connection between the chain links can be formed in a torsionally rigid manner. This enables a one-sided guide of the covering element in the gap: in this way, for example, guide portion formed on one side edge of the upper side of the chain links for adjoining a guide acting as a hold-down device, is sufficient to arrange such a covering element in the gap, and even over a larger gap length, in a self-supporting manner.

A further advantageous embodiment of the covering element provides that the covering element is formed as an energy guiding chain having a supporting sheath, in whose interior a guide channel is provided, which preferably serves to receive at least one line (e.g., supply line, power line, etc.), wherein the housing covers of the chain links of the supporting sheath are formed as brush supports or receive a brush support. Standardized chain links can thus be resorted to, which are adapted with regard to the housing cover, such that the brush supports correspond to the workpiece support surfaces of the machine for separative machining, for which the use of the covering element is provided.

In the covering element, the brush support can be formed of individual bundles of brushes, wherein, for example, the distance of the individual brush bundles from one another is not greater than about 40 mm. Sufficient support can thus be provided in the gap to also accommodate small, already cut or partially cut workpiece parts, which, for example, remain in the residual grid, without them tilting.

The invention and further advantageous embodiments and developments of the same are further described and explained with reference to the examples illustrated in the drawings. The features to be taken from the description and the drawings may be applied individually or in any combination according to the invention.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
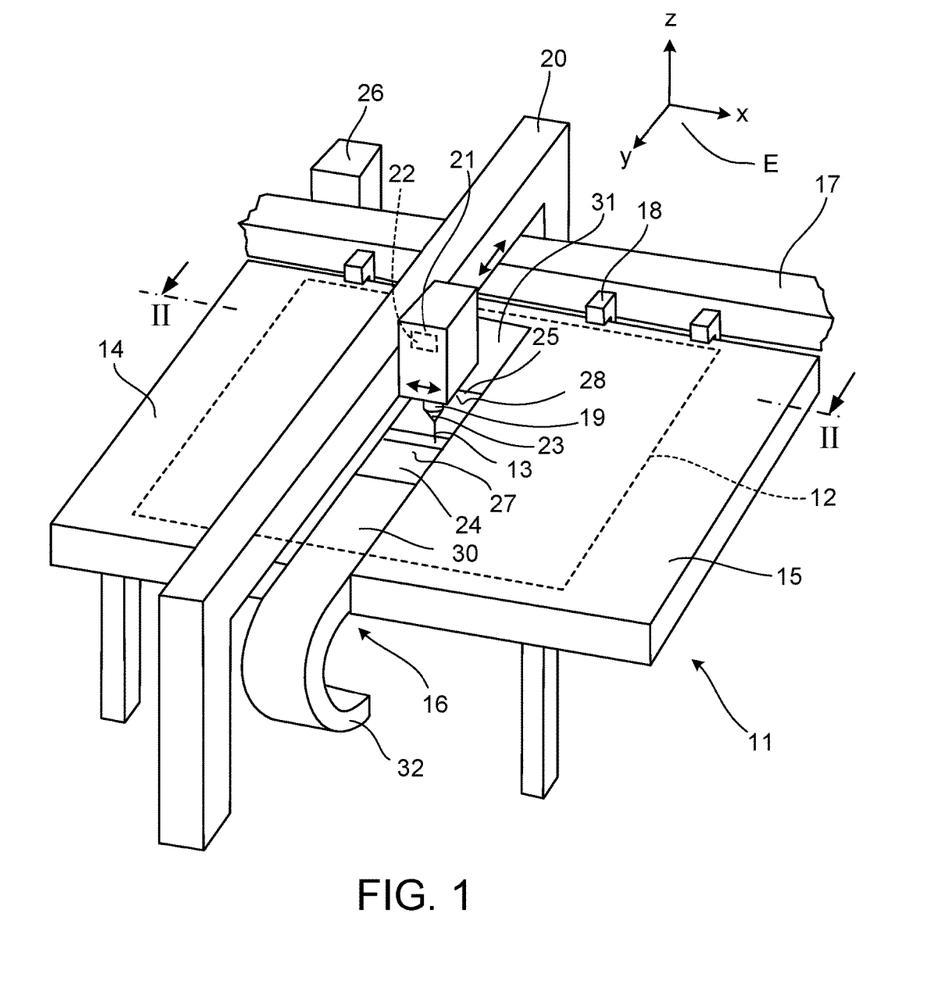
FIG. 1 shows a perspective view of one example of a machine for separative machining having at least one covering element arranged in a gap between two workpiece supports.

In FIG. 1, a machine 11 for separative machining of a dotted plate-shaped workpiece 12 having a machining tool is illustrated by way of example, wherein in this example the separative machining is carried out by means of a cutting beam 13 as a machining tool. The machine 11 can be formed as a laser machine tool for laser cutting workpieces 12 with a laser beam. For cutting machining of the workpiece 12, the cutting beam 13 can also be a plasma jet or a water jet. Alternatively, the separative machining can be carried out using the machine tool, for example in the form of punching tools. The workpiece 12 rests on two workpiece support surfaces 14, 15 during the machining, which form the upper side of two work tables in the example shown, and define a support plane E (XY plane of an XYZ coordinate system) for supporting the workpiece 12. The workpiece support surfaces 14, 15 can be formed by table tops or pin-shaped support elements, by support bands, rollers, balls, air buffers or, for example, by brushes. By means of a movement and handling device 17, which has a drive and a clamping device 18 in the form of clamping claws for holding the workpiece 12, the workpiece 12 on the workpiece support surfaces 14, 15 can be controllably moved in a first movement direction X and moved onto a predetermined workpiece position. It is also possible, for example, for the workpiece support surfaces 14, 15 to be designed themselves as a movement device for movement or support of the movement of the workpiece 12 in the X direction, such as, for example, in the form of one or several conveyor belts, as described in DE 10 2011 051 170 A1 by the applicant or in JP 06170469.

Between the two workpiece support surfaces 14, 15, a gap 16 is formed, which extends in a second direction (Y direction) over the entire travel distance of a cutting head 19, which aligns and focuses the cutting beam 13 onto the workpiece 12. The cutting head 19 can be controllably moved in the Y direction above the gap 16 by means of a driven carriage 21 serving as a movement device, which is guided to a fixed portal 20. Additionally, in the example shown, the cutting head 19 within the gap 16 can also be controllably moved in the X direction and, with help of the additional movement device 22 which is mounted on the carriage 21, can be controllably moved in the X direction, for example in the form of a linear drive. The maximum travelling movement of the cutting head 19 in the X direction is lower in the example shown than the width of the gap 16. With help of the movement devices 21, 22, which are constructed one on top of the other, the cutting head 19 can be positioned both in the X direction and in the Y direction in a desired cutting position within the gap. If necessary, the cutting head 19 can also be moved in a third movement direction (Z direction) to adjust the distance between the machining nozzle 23 of the cutting head 19 and the workpiece surface.

Two support carriages 24, 25 are arranged within the gap 16, which each extend over the width of the gap 16 and are controllably moveable independent of one another in the gap in the Y direction. The controlled movement of the support carriages 24, 25 in the gap 16 can be carried out, for example, with the help of drives, which are mounted on the respective support carriages 24, 25. For example, spindle drives can be provided.

The machine 11 has a control device 26 for controlling the cutting machining, which serves to coordinate the movements of the workpiece 12, the cutting head 19, and the support carriages 24, 25 to set a desired workpiece position and a desired cutting head position, as well as a desired position of the support carriages 24, 25 to enable cutting of a predetermined cut contour and support the workpiece 12 in the region of the gap 16.

The support carriages 24, 25 have support surfaces 27, 28, on which the workpiece 12, which is to be machined by means of the cutting beam 13, rests during machining. A respective end of at least one covering element 30, 31 is attached to outer edges of the support surfaces 27, 28 of the support carriages 24, 25, said outer edges facing away from each other and running in the X direction, to cover the gap 16. Each covering element 30, 31 is preferably arranged on a respective support carriage 24, 25. Between the support carriages 24, 25, the actual cutting area is formed, in which another or several further support carriages can be arranged. The additional support carriages can have a differently designed, for example metallic and smooth, surface, and can be movable while coupled with the carriages 24, 25.

Alternatively, only one support carriage 24 can be provided in the gap 16, with which one or two covering elements 30, 31 engage. In a further variant, the carriage or carriages 24, 25, which are connected to the covering elements 30, 31 and serve for their travelling movement, are formed without support surfaces 27, 28 and are arranged, for example, beneath the covering elements 30, 31.

Figure 2:
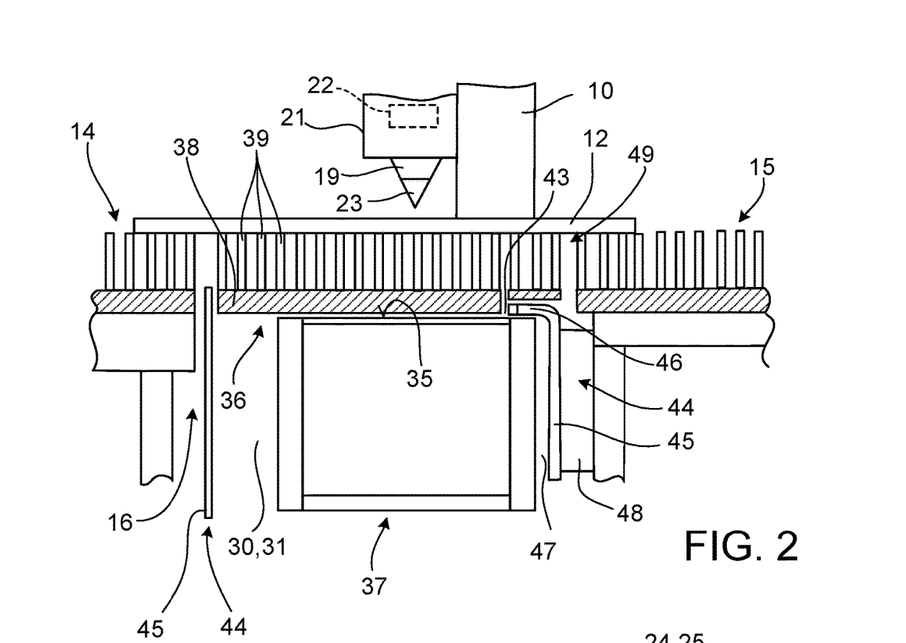
FIG. 2 shows a schematically enlarged detailed view of the covering element in the gap of the machine according to cut line II-II in FIG. 1.

In FIG. 2, a schematic sectional view along the line II-II in FIG. 1 is illustrated. The gap 16, as well as the workpiece support surfaces 14, 15 engaging with the gap 16, and the movement device 21, 22 appear enlarged. The other components are not shown for the sake of clarity.

Figure 4:
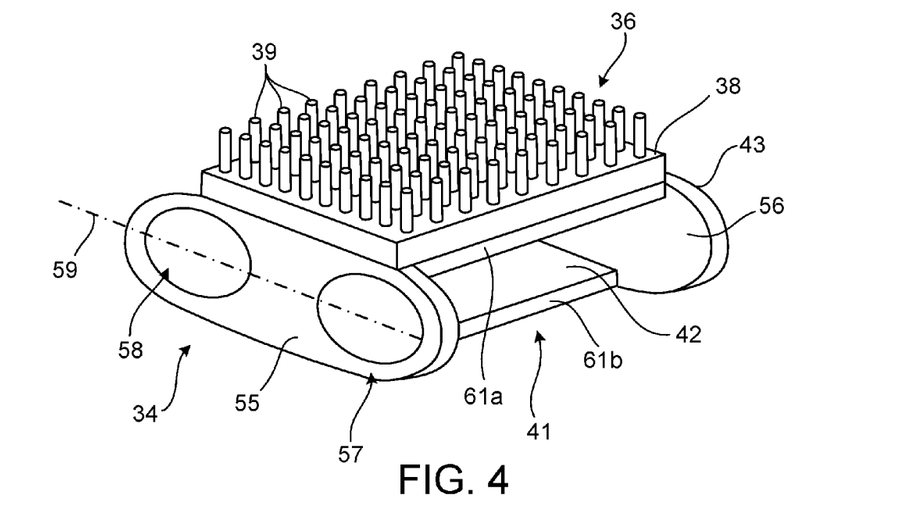
FIG. 4 shows a perspective view of a chain link of the covering element illustrated in FIG. 1.

The covering element 30 or 31 is arranged in the gap 16 between the two workpiece support surfaces 14, 15, said covering element being formed as a chain 37 and having several chain links 34 (FIG. 4). On an upper side 35 of the respective chain links 34, a brush support 36 is provided. This brush support 36 can consist of a plate 38 on which several bundles of brushes 39 are provided in a distributed manner, wherein the brush length of the brush bundles 39 is chosen in such a way that these bundles lie flush with the adjacent brushes of the workpiece support surfaces 14, 15 during positioning of the covering element 30, 31 in the gap 16, to form a level support for the workpiece 12.

Figure 3:
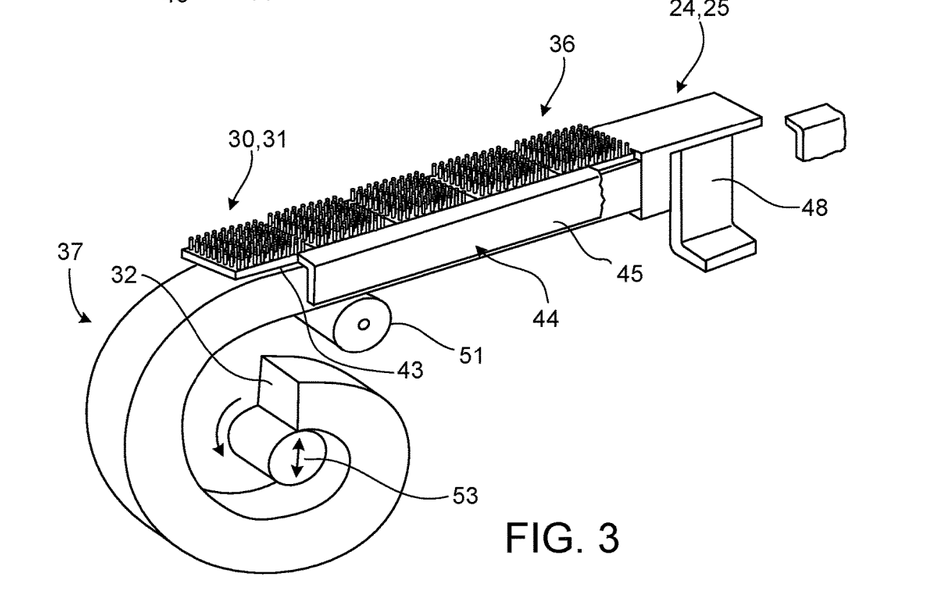
FIG. 3 shows a perspective view of a covering element arranged on a support carriage, having a guide in the gap according to the machine in FIG. 1.

As shown in FIGS. 2 and 3, a guide portion 43, which is positioned laterally on the upper side 35 of the chain link 34 (or alternatively on the surface of the plate 38), remains free so that a guide 44 can engage with the upper side 35 of the chain links 34 or the plates 38, to guide the chain links into the gap 16. This guide 44 is formed as a rail 45 and is fastened, for example, on an underside of the workpiece support surface 14, 15 or on a machine table not described in further detail, by means of a holder 48. The rail 45 comprises at least one hold-down device 46, which the upper sides 35 of the chain links 34 or the plates 38 abut from beneath. The rail 45 can be, for example, formed in an L shape, wherein a short flank of the L-shaped rail forms the holding-down element 46, and a long flank, which is vertically orientated, forms a lateral guide 47 for the chain links 34. On the hold-down element 46, a brush support 49 is further provided to close a space formed between the workpiece support surface 15 and the brush support 36 on the chain links 34. The design of this brush support 49 corresponds advantageously to that which is on the chain links 34.

Figure 5:
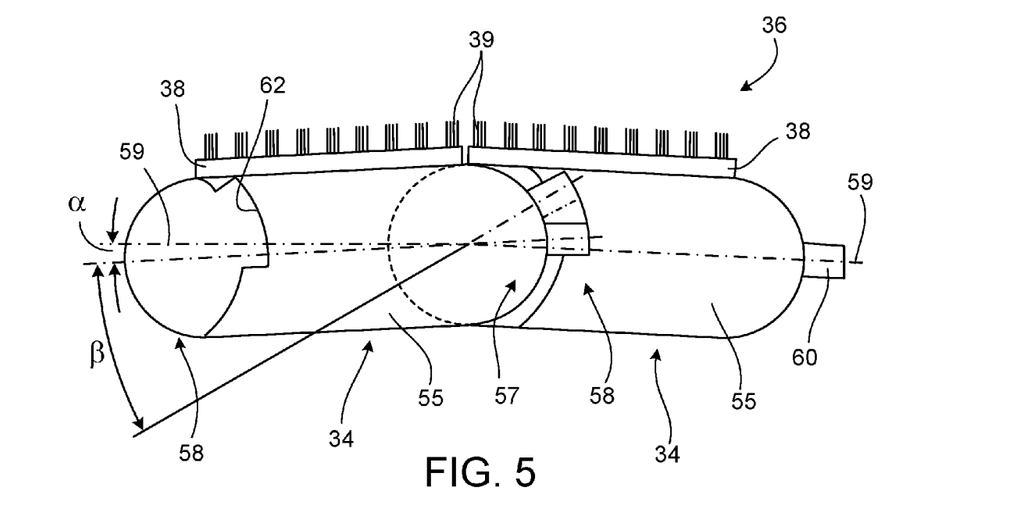
FIG. 5 shows a schematic view of two adjacent chain links.

FIG. 3 illustrates a perspective view of the covering element 30, 31 without the adjacent workpiece support surface 14, 15. The guide 44 extends along the gap 16 extending in the Y direction between the workpiece support surfaces 14, 15, such that the covering elements 30, 31 are guided and aligned independently of the position of the support carriages 24, 25 and, consequently, of the covering elements 30, 31. The chain links 34, which are adjacent to one another, are connected to one another in a pivotably hinged manner in a direction, so that unwinding and deflection are possible. During transfer of the chain links 34 into a plane, which is preferably parallel to the level of the workpiece support surface 14, 15, a bulging alignment of the chain links 34 relative to the plane is achieved due to a predetermined pivot-limiting angle α (as shown in FIG. 5). Since a guide portion 43 is formed on the upper side 35 of the chain links 34, said guide portion being held down by the hold-down device 46 along the gap 16, a bias acts on the chain links 34, such that even with a longer covering distance, sagging of the covering element 30, 31 is prevented. Due to this embodiment of the pivot-limiting angle α, the chain links 34 are held in a defined position relative to the gap 16 along the entire length of the guide 44, and close said gap.

At the entrance of the gap 16, a support point 51 is provided underneath the hold-down element 46, to form a defined entrance position of the chain links 34 for the guide 44 in the gap 16. This support point 51 is provided, for example, when the end 32 of the covering element 30, 31 is wound up and unwound, for example under or adjacent to the workpiece support surface 14, 15, by means of a winding shaft 53, which is illustrated schematically. Here, the winding shaft 53 can be moved in the Z direction and/or in the Y direction depending on the windings of the covering element 30, 31 accommodated by the winding shaft 53, to reduce projection of the covering element 30, 31 beyond the workpiece support surface 14, 15.

FIG. 4 is a perspective view, and FIG. 5 is a side view of a chain link 34 or two adjacent chain links 34 of the chain 37. A protective casing 41 comprises sidewalls 55, 56 on whose respective ends hinges 57, 58 are formed. The hinges 57, 58 of the chain links 34 are designed to define a pivot angle β between two adjacent chain links 34. The pivot angle β can comprise, for example, 1° to 60°. In an angled position, a pivot position of a longitudinal axis 59 of a sidewall 55 of one chain link 34 forms a pivot angle β relative to the longitudinal axis 59 of the sidewall 55 of the adjacent chain link. The pivot angle β may be for example, 1° to, for example, 10°, 20°, 30° or greater. In a non-pivoted position, the chain links 34 are aligned with one another by a pivot-limiting angle α of, for example, 1°, so that the longitudinal axes 59 of the adjacent chain links 34 do not lie in a mutual axis. The pivot-limiting angle α is directly adjoined to the longitudinal axis 59 of the chain link 34 in one direction. The pivot angle β is provided pointing in the same direction and adjoining the pivot-limiting angle α, which determines and restricts the pivot region of the two chain links relative to each other.

In particular, two adjacent chain links each include a projection (or a pin) 60 and a depression or a curved recess 62 to provide for the pivoting of the chain links with respect to each other. In FIG. 5, the projection 60 is guided in the curved recess 62 and can be moved within both angles α and β, which are defined by the length of the curved recess 62. The projection 60 extends from the hinge 57, and the recess 62 is defined within the hinge 58. In some examples, the projection 60 extends from, and the recess 62 is curved within, the sidewall 55.

Between the sidewalls 55, 56, bars (or plates) 61a, 61b extend, by which a guide channel 42 is formed in the supporting sheath 41. Supply lines can be guided within the guide channel 42. The brush support 36 can be applied in a laterally offset manner on a bar or plate 61a which forms the housing cover, so that a guide portion 43 remains along the longitudinal extent of the chain links 34.

The individual chain links 34 are formed in an inherently torsionally rigid manner by the support casing 31. The hinges 57, 58 are likewise connected with the adjacent hinges 57, 58 of the chain links 34 in a torsionally rigid manner. A chain link 34 associated with the support carriage 24, 25 is fixedly secured to the support carriage 24, 25. In particular, the chain link 34 is arranged in a torsionally rigid and non-rotatable manner on the support carriage 24, 25. The opposite end 32 of the chain 37 is likewise torsionally rigid and non-rotatable with respect to the last chain link 34 on the winding shaft 53, a guide or at a fixed bearing point.

Figure 6:
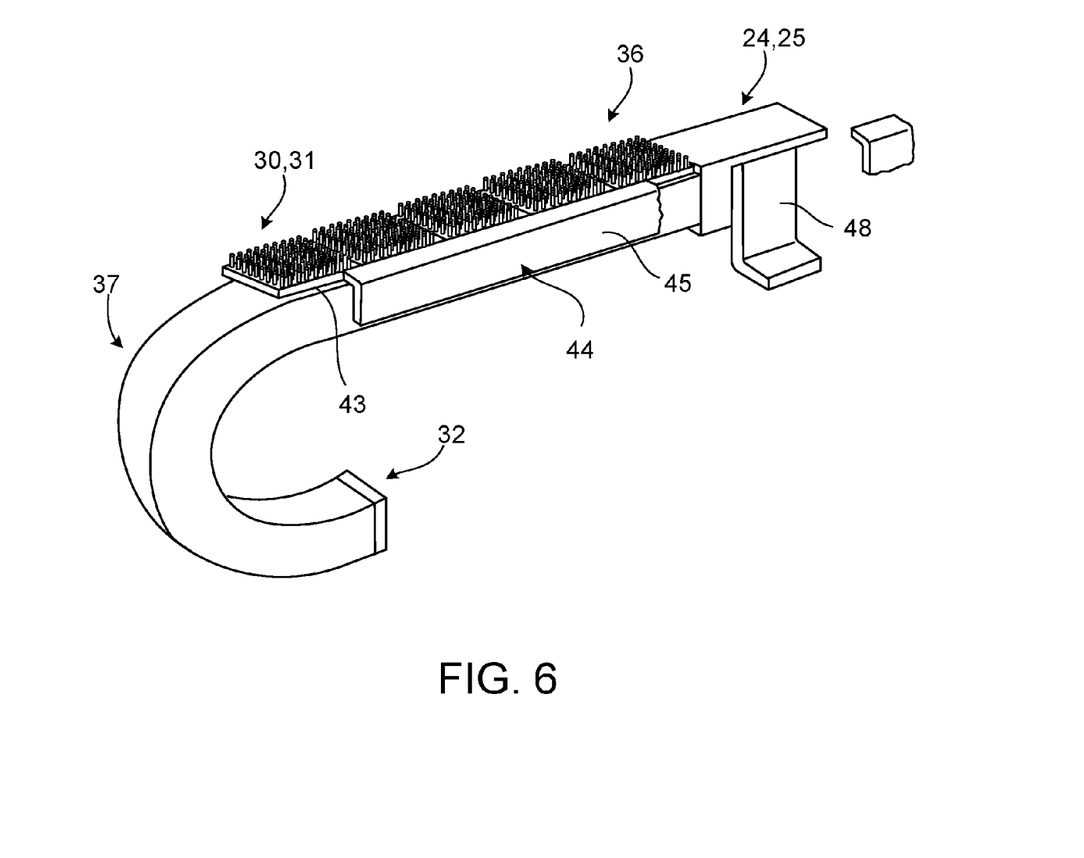
FIG. 6 shows a perspective view of the covering element having a guide in the gap and an alternative connection of a fixed end of the covering element.

FIG. 6 illustrates an alternative embodiment to FIG. 3, in which the end 32 of the covering element 30, 31, which is opposite the support carriage 24, 25, is fixedly arranged at a bearing point. Here, the distance of the fixed end 32 of the covering element 30, 31 to the hold-down device 46 of the guide 44 can be determined by the maximum pivot angle of the chain links 34 relative to one another. In this case, this distance is preferably set to be smaller than the pivoting radius of the chain in the case of a 180° deflection, so that a bias is built up on the chain due to the reduced distance, whereby a support or a support point 51 is rendered superfluous.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:
1. A machine having a machining tool for separative machining of a plate-shaped workpiece, the machine comprising:

two workpiece support surfaces for supporting the workpiece, wherein the two workpiece support surfaces are arranged to form a gap between them;
at least one carriage arranged to move within or along the gap; and
at least one covering element connected to the carriage and arranged to at least partially cover the gap, wherein the covering element comprises:
a chain with a plurality of chain links that can pivot relative to one another, and
a brush support on an upper side of one or more of the chain links;
wherein at least two adjacent chain links of the chain define a pivot-limiting angle ($\alpha$) relative to a longitudinal axis of each of the chain links, such that when no force is applied, the chain links assume a non-planar course in a rectilinear alignment relative to one another.

2. The machine of claim 1, wherein the plurality of chain links assume a convex course in a rectilinear alignment relative to one another.

3. The machine of claim 1, wherein the pivot-limiting angle ($\alpha$) is at least 1°.

4. The machine of claim 1, wherein the chain links are pivotable at a pivot angle ($\beta$) of at least 1° to 60° that extends outwards from the longitudinal axis and adjoins the pivot-limiting angle ($\alpha$).

5. The machine of claim 1, wherein the brush support comprises a set of brushes fitted on a plate.

6. The machine of claim 1, further comprising a guide arranged in or adjacent to the gap, by which the chain links are guided and the brush supports of the respective chain links are arranged in the gap flush to the workpiece support surfaces.

7. The machine of claim 6, wherein the guide comprises at least one rail arranged as a hold-down element for the chain links in the gap and against which the chain links abut during the travelling movement of the covering element.

8. The machine of claim 7, wherein the guide has a brush support arranged on the rail.

9. The machine of claim 6, wherein the guide comprises an L-shaped rail arranged to hold down the respective chain links, wherein the L-shaped rail comprises a horizontally orientated flank and a vertically oriented flank that forms a lateral guide for the respective chain links.

10. The machine of claim 6, further comprising a support point provided at an entrance of the gap for the chain links entering the gap, and arranged to position the chain for the guide.

11. The machine of claim 6, wherein a guide portion without a brush support is arranged above the upper side of the respective chain links along a side edge of the chain, and wherein the guide portion abuts the guide.

12. The machine of claim 1, wherein a first end of the covering element comprising a chain in the gap is moveably fastened on the carriage and a second end of the chain is rollably arranged on a winding shaft or in a guide.

13. The machine of claim 1, wherein the covering element comprises:
an energy guiding chain; and
a housing cover for at least one of the chain links of the energy guiding chain, wherein the housing cover comprises one or more brush supports.

14. A covering element for a machine, the covering element comprising:
a chain comprising a plurality of chain links, wherein the chain links are arranged adjacently in a row and are pivotable relative to one another; and
a brush support on an upper side of one or more of the chain links;
wherein at least two adjacent chain links of the chain define a pivot-limiting angle ($\alpha$) relative to longitudinal axis of each of the chain links, such that when no force is applied, the chain links assume a non-planar course in a rectilinear alignment with respect to one another.

15. The covering element of claim 14, wherein the plurality of chain links assume a convex course in a rectilinear alignment relative to one another.

16. The covering element of claim 14, wherein the pivot-limiting angle ($\alpha$) is at least 1°.

17. The covering element of claim 14, wherein the chain links are pivotable relative to one another at a pivot angle ($\beta$) of 1° to 60° that adjoins the pivot-limiting angle ($\alpha$) and extends outwards from the longitudinal axis of each of the chain links.

18. The covering element of claim 14, wherein the chain links are torsionally rigid, and are connected to one another by torsionally rigid hinged connections.

19. The covering element of claim 14, wherein the covering element comprises an energy guiding chain that forms a supporting sheath and comprises a bar forming a housing cover and an interior guide channel, wherein the housing cover comprises or is arranged to receive a brush support.

20. The covering element of claim 14, wherein the brush support comprises a plurality of brush bundles with a distance of less than 40 mm from one another.

* * * * *